(12) United States Patent
Phillips

(10) Patent No.: US 6,453,565 B1
(45) Date of Patent: Sep. 24, 2002

(54) UNIVERSAL BLADE ADAPTER

(75) Inventor: Alan Gene Phillips, Jackson, TN (US)

(73) Assignee: Porter-Cable/Delta, Jackson, TN (US)

( * ) Notice: Subject to any disclaimer, the term of this patent is extended or adjusted under 35 U.S.C. 154(b) by 0 days.

(21) Appl. No.: 09/767,681

(22) Filed: Jan. 24, 2001

(51) Int. Cl.⁷ .............................................. B27B 11/06
(52) U.S. Cl. ............................. 30/392; 30/332; 30/334
(58) Field of Search ........................ 30/329, 332, 334, 30/392

(56) References Cited

U.S. PATENT DOCUMENTS

| | | | | |
|---|---|---|---|---|
| 3,528,463 A | * | 9/1970 | Mejia | ......................... 30/392 |
| 4,294,013 A | * | 10/1981 | Krieg | ......................... 30/392 |
| 4,838,138 A | * | 6/1989 | Rice et al. | .................... 30/392 |
| 5,575,071 A | | 11/1996 | Phillips et al. | ................. 30/292 |
| 6,178,646 B1 | * | 1/2001 | Schnell et al. | ................. 30/392 |
| 6,237,231 B1 | * | 5/2001 | Jungmann et al. | ............ 30/392 |

OTHER PUBLICATIONS

Porter–Cable General Product Catalog, Hook–Shank Blades, Universal–Shank Blades, Tang–Shank Blades, All–Purpose Blades, pp. 16, 17, and 19, published prior to Jan. 24, 2001.

* cited by examiner

*Primary Examiner*—Hwei-Siu Payer
(74) *Attorney, Agent, or Firm*—Hunton & Williams

(57) ABSTRACT

A blade adapter for a reciprocating-type saw permits non-standard blades to be used in the saw. The blade adapter is sized and configured to be fit inside of a blade clamp of the saw, and includes an interior perimeter which accepts the shank of a non-standard saw blade. The blade adapter positions the saw blade inside of the blade clamp so that it can be clamped therein for cutting. It is simple to use and easily manufactured.

18 Claims, 2 Drawing Sheets

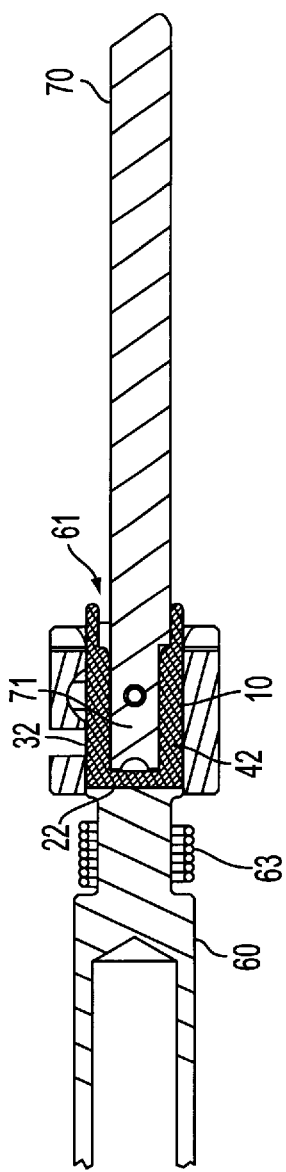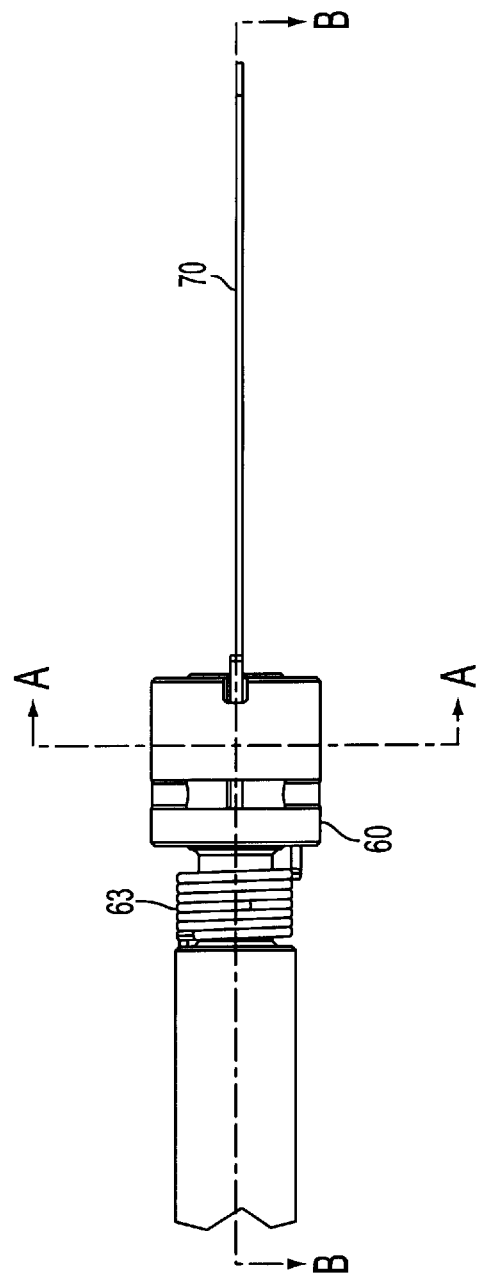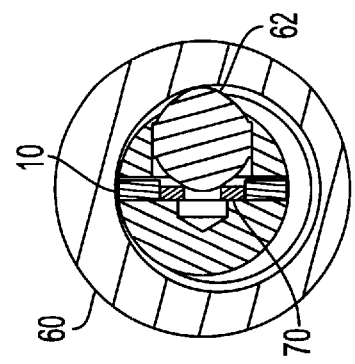
FIG. 2B
FIG. 2A
FIG. 2C

UNIVERSAL BLADE ADAPTER

BACKGROUND OF THE INVENTION

1. Field of the Invention

The present invention relates to a universal blade adapter useful in, for example, hand-held, reciprocating motion power saws having removable blades. The invention also relates to a method of adapting for use in a particular type of saw, a saw blade designed for use in another type of saw.

2. Description of Related Art

Reciprocating motion power saws with removable blades which move reciprocally in a longitudinal direction are known in the art and include reciprocating saws and jig saws (also called bayonet saws and saber saws). Reciprocating saws are typically more powerful than jig saws. Most reciprocating saws use a standard blade which is sized and configured for use with these saws. Jig saws use one of a number of different blade designs, all of which are typically smaller than reciprocating saw blades. Specifically, the distance from the toothed edge to the back edge of the blade is typically smaller in jig saw blades than in reciprocating saw blades.

It would be advantageous, in certain situations, to use a smaller jig saw blade in a reciprocating saw. The smaller blade would allow smaller radius curves to be cut with the reciprocating saw than is possible with standard reciprocating saw blades. For example, a tradesman may desire to cut a small radius hole in a joist for passing a conduit through the joist. Such a small radius cut made with a reciprocating saw could be facilitated with a smaller blade. Many other applications for using a smaller jig saw blade in a reciprocating saw also are envisioned.

Reciprocating saws, and other similar saws, typically are equipped with a mechanism that clamps or otherwise holds the reciprocating saw blade in position during operation (hereinafter referred to as a "blade clamp"). These blade clamps enable an operator to remove the blade and replace it with another. A tool sometimes is required to remove and replace the blade, or toolless blade clamps are known to enable easy removal and replacement of the blade. U.S. Pat. No. 5,575,071, the disclosure of which is incorporated by reference herein in its entirety, describes one tool-less blade clamp. The blade clamp disclosed in the above-mentioned patent is useful with a saw blade having a standardized shank design. This blade clamp would not work well with saw blades having non-standardized shanks. Moreover, neither the blade clamp described in U.S. Pat. No. 5,575,071, nor any of the other blade clamps described therein (toolless or otherwise) are capable of use with other sized blades, such as the smaller blades of jig saws, since the smaller blades are not properly sized or configured for those clamps.

SUMMARY OF THE INVENTION

It would therefore be desirable to provide a universal blade adapter that can be used with blades having various shank configurations. It also would be desirable to provide a universal blade adapter that can be used to enable the use of a saw blade designed for a particular type of saw (e.g., a jig saw blade) in a different type of saw (e.g., a reciprocating saw).

It is therefore a feature of an embodiment of the present invention to provide a blade adapter that will allow use of non-standard saw blades in saws. It is further a feature of an embodiment of the present invention to provide a blade adapter that will allow use of smaller jig saw blades in reciprocating saws. It is another feature of an embodiment of the present invention to provide a blade adapter that is simple and inexpensive to manufacture. It is an additional feature of an embodiment of the invention to provide a method of adapting a jigsaw blade for use in a reciprocating saw.

These and other features and advantages of various embodiments of the invention can be achieved by providing a blade adapter for using a saw blade having a shank with a blade clamp having a space for accepting a saw blade shank. The blade adapter includes an end portion with an interior and exterior edge, a first side portion with an interior and exterior edge, and a second side portion with an interior and exterior edge. An exterior perimeter of the blade adapter is formed by the exterior edges of the end portion, the first side portion, and the second side portion. The exterior perimeter is sized to fit inside of the space for accepting a saw blade shank of the blade clamp. The blade adapter further includes an interior perimeter that is formed by the interior edges of the end portion, the first side portion, and the second side portion. The interior perimeter is sized to accept the shank of the saw blade.

Another embodiment of the invention is a method of adapting a reciprocating saw to accept non-standard saw blades. The method includes fitting a blade adapter inside of a space for accepting a saw blade shank of a blade clamp, and fitting a non-standard saw blade inside of an interior perimeter of the blade adapter so that the saw blade is supported by the blade clamp for cutting.

The blade adapter enables the use in a particular saw of a blade designed for use with a different type of saw. The blade adapter also is simple and easy to manufacture, and can be stamped from inexpensive materials such as steel. The blade adapter also enables the use of a variety of jigsaw blades in a reciprocating saw.

Other features and advantages of the invention will be readily apparent to those skilled in the art upon review of the following Detailed Description of Preferred Embodiments when read in light of the attached drawings.

BRIEF DESCRIPTION OF THE DRAWINGS

FIG. 2A is a top view of the blade adapter of FIG. 1A in use with a blade clamp for a reciprocating saw and a saw blade;

FIG. 2B is a sectional view of the blade adapter, blade clamp, and saw blade taken from line B—B of FIG. 2A;

FIG. 2C is a sectional view of the blade adapter, blade clamp, and saw blade taken from line A—A of FIG. 2A.

DETAILED DESCRIPTION OF THE PREFERRED EMBODIMENTS

The present invention relates to a blade adapter for using a saw blade having a shank with a blade clamp having a space for accepting a saw blade shank. The blade adapter includes an end portion with an interior and exterior edge, a first side portion with an interior and exterior edge, and a second side portion with an interior and exterior edge. An exterior perimeter of the blade adapter is formed by the exterior edges of the end portion, the first side portion, and the second side portion, whereby the exterior perimeter is sized to fit inside of the space for accepting a saw blade shank of the blade clamp. The blade adapter further includes an interior perimeter that is formed by the interior edges of the end portion, the first side portion, and the second side portion, whereby the interior perimeter sized to accept the shank of the saw blade.

It is preferred in an embodiment of the invention that the exterior perimeter of the blade adapter is sized to fit inside of a blade clamp for a reciprocating saw, and the interior perimeter is sized to accept the shank of a jig saw blade. In this embodiment the blade adapter preferably is thicker than the jig saw blade, and the blade adapter is manufactured from steel in a stamping process. It also is preferred in this and other embodiments of the invention that the blade adapter further include at least one finger adapted to extend from the blade clamp to allow a user to grasp the finger when the blade adapter is fitted in the blade clamp and thereby remove the blade adapter.

Another preferred feature of an embodiment of the invention is a method of adapting a reciprocating saw to accept non-standard saw blades. The method includes fitting a blade adapter inside of a space for accepting a saw blade shank of a blade clamp, and fitting a non-standard saw blade inside of an interior perimeter of the blade adapter so that the saw blade is supported by the blade clamp for cutting. It is preferred in the method that the non-standard saw blade is a jig saw blade, and that the blade adapter is the above-described blade adapter.

Figure 1A:
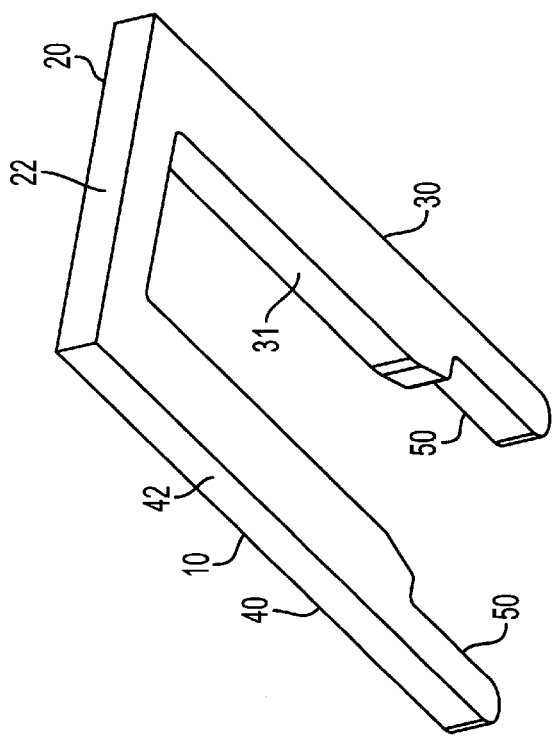
FIG. 1A is an isometric view of one embodiment of a blade adapter.
Figure 1C:
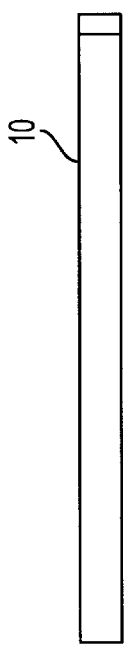
FIG. 1C is a top view of the blade adapter of FIG. 1A.
Figure 1B:
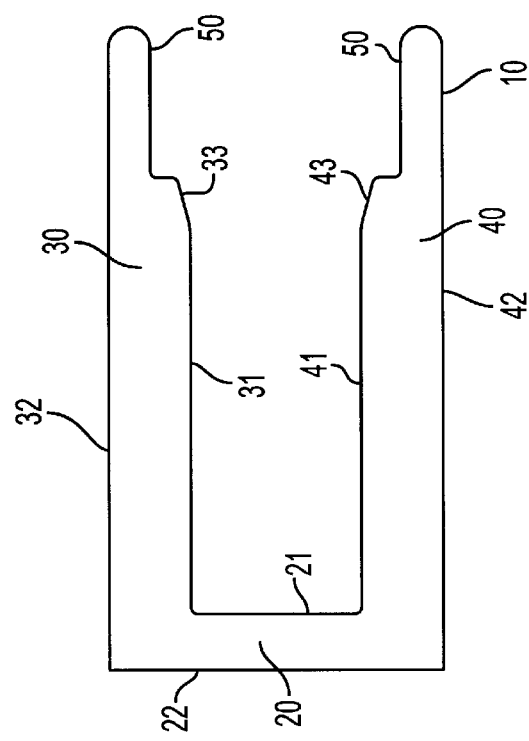
FIG. 1B is a front view of the blade adapter of FIG. 1A.

Particularly preferred embodiments of the invention now will be described with reference to the attached drawings. A blade adapter 10 according to the present invention is shown in FIGS. 1A–1C. The blade adapter 10 includes an end portion 20 and first and second side portions 30 and 40, preferably arranged in approximately a "U"-shape. The end portion 20 has an interior edge 21 and an exterior edge 22. The first and second side portions 30 and 40 each have an interior edge 31, 41 and an exterior edge 32, 42. The three interior edges 21, 31, 41 cooperate to form an interior perimeter of the blade adapter 10. The three exterior edges 22, 32, 42 cooperate to form an exterior perimeter of the blade adapter 10.

The blade adapter 10 is shown in use with a reciprocating saw in FIGS. 2A–2C. The depicted preferred embodiment of blade adapter 10 in FIGS. 2A–2C is especially adapted to work with the particular blade clamp and saw blade depicted therein. Adapting blade adapter 10 for use with other similar blade clamps and saw blades is also within the scope of the invention. Those skilled in the art will be capable of adapting blade adapter 10 for use with other similar blade clamps and saw blades, using the guidelines provided herein.

The blade adapter 10 has been fitted inside of a blade clamp 60 of the reciprocating saw. The depicted blade clamp 60 in FIGS. 2A–2C is similar to the blade clamp disclosed in U.S. Pat. No. 5,575,071, the disclosure of which is incorporated herein by reference in its entirety. However, the size and configuration of blade adapter 10 may be modified to work with any of a number of blade clamps. The blade clamp 60 includes a space 61 for accepting a saw blade shank which normally receives the shank of a standard reciprocating saw blade (first saw blade, not shown). The exterior perimeter of the blade adapter 10 (formed by edges 22, 32, 42) is sized to fit tightly inside the space 61. The interior perimeter of the blade adapter 10 (formed by edges 21, 31, 41) is sized to tightly accept a shank 71 of a saw blade 70 (second saw blade). The standard reciprocating saw blade and the saw blade 70 are not the same size. Without the blade adapter 10, saw blade 70 could not be adequately supported inside of blade clamp 60 for use in cutting. Blade adapter 10 preferably has a thickness somewhat thicker than saw blade 70, yet is still able to fit within space 61 of blade clamp 60. configuration of blade adapter 10 may be modified to work with any of a number of blade clamps. The blade clamp 60 includes a space 61 for accepting a saw blade shank which normally receives the shank of a standard reciprocating saw blade. The exterior perimeter of the blade adapter 10 (formed by edges 22, 32, 42) is sized to fit tightly inside the space 61. The interior perimeter of the blade adapter 10 (formed by edges 21, 31, 41) is sized to tightly accept a shank 71 of a saw blade 70. Without the blade adapter 10, saw blade 70 could not be adequately supported inside of blade clamp 60 for use in cutting. Blade adapter 10 preferably has a thickness somewhat thicker than saw blade 70, yet is still able to fit within space 61 of blade clamp 60.

Blade clamp 60 depicted in FIGS. 2A–2C normally accepts a properly sized and configured blade into its space 61 and securely holds the blade for cutting by clamping the blade inside the space 61 with ball 62. Ball 62 is releasably biased through a spring 63 against a hole formed in a properly configured saw blade and pushes the saw blade against an opposite wall of the space 61. Blade adapter 10 is sized so that it positions a hole which may be formed in the shank of saw blade 70 adjacent to ball 62 when saw blade 70 and blade adapter 10 are fitted inside of blade clamp 60. Thus, ball 62 is biased against the hole and effectively clamps saw blade 70 inside of the blade clamp 60 for cutting.

As shown in FIGS. 1A–1C, fingers 50 preferably are formed on an end of blade adapter 10 opposite end portion 20. Fingers 50 preferably are adapted to extend from blade clamp 60 (as shown best in FIG. 2B) so that a user can grasp blade adapter 10 by its fingers 50 and thereby remove blade adapter 10 from blade clamp 60. Cammed surfaces 33 and 43 are formed on the interior perimeter of side portions 30 and 40, respectively, at an end of blade adapter 10 opposite end portion 20. Cammed surfaces 33 and 43 aid in the insertion of a saw blade. At each intersection of the interior edges 21, 31 and 31, 41 is a fillet to reduce the stress around these intersections. Blade clamp 10 preferably is manufactured using a steel stamping process and can be hardened to increase its life.

While the invention has been described with reference to particularly preferred embodiments as depicted in the drawings, those skilled in the art will appreciate that various modifications may be made to the invention without departing from the spirit and scope thereof.

I claim:

1. A blade adapting system comprising:
    a blade clamp having a space adapted for accepting the shank of a first saw blade;
    a second saw blade having a shank;
    a blade adapter comprising:
        an end portion with an interior edge and an exterior edge;
        a first side portion with an interior edge and an exterior edge;
        a second side portion with an interior edge and an exterior edge;
        an exterior perimeter of the blade adapter formed by the exterior edges of the end portion, the first side portion, and the second side portion, the exterior perimeter sized to fit inside of the blade clamp in the space for accepting the first saw blade shank; and,
        an interior perimeter of the blade adapter formed by the interior edges of the end portion, the first side portion, and the second side portion, the interior perimeter sized to accept the shank of the second saw blade, wherein the first saw blade shank and the second saw blade shank are different sizes.

2. The blade adapting system of claim 1 in combination with a reciprocating saw wherein the blade clamp is attached to the reciprocating saw and the second saw blade is adapted to fit a jig saw.

3. The combination of claim 2 wherein the blade adapter is thicker than the second saw blade.

4. The combination of claim 3 wherein the blade adapter is manufactured from steel in a stamping process.

5. The combination of claim 4 further comprising:
   at least one finger adapted to extend from the blade clamp to allow a user to grasp the at least one finger when the blade adapter is fitted in the blade clamp and thereby remove the blade adapter.

6. The blade adapting system of claim 1 further comprising:
   at least one finger adapted to extend from the blade clamp to allow a user to grasp the at least one finger when the blade adapter is fitted in the blade clamp and thereby remove the blade adapter.

7. A method of adapting a reciprocating saw to accept non-standard saw blades utilizing the blade adapting system according to claim 1, the method comprising the steps of:
   fitting the blade adapter inside of the blade clamp; and,
   fitting the second saw blade inside of the interior perimeter of the blade adapter so that the second saw blade is supported by the blade clamp for cutting.

8. The method of claim 7 wherein the second saw blade is a jig saw blade.

9. A blade adapting system for permitting a saw to utilize non-standard saw blades comprising:
   a blade clamp adapted to be mounted to a saw, the blade clamp having a space sized for the shank of a first saw blade and a blade biasing means for holding a saw blade in the blade clamp;
   a second saw blade having a shank; and
   a blade adapter;
   wherein the blade adapter and the second saw blade are fitted in the space of the blade clamp, the shank of the second saw blade being positioned by the blade adapter in the space so that the blade biasing means biases against the second saw blade thereby holding the second saw blade in the blade clamp, and the first saw blade shank and the second saw blade shank are different sizes.

10. The blade adapting system according to claim 9 wherein the saw is a reciprocating saw and the second saw blade is sized to fit a jig saw.

11. The blade adapting system according to claim 9 wherein:
    the means blade biasing comprises a ball biased by a spring; and
    the second saw blade shank has a hole formed therein, the second saw blade shank being positioned in the blade clamp by the blade adapter so that the ball is biased into the hole.

12. The blade adapting system according to claim 11 wherein the saw is a reciprocating saw and the second saw blade is sized to fit a jig saw.

13. The blade adapting system according to claim 9 wherein the blade adapter is a generally U-shaped member with an end portion having first and second distal ends, a first side portion connected to the first distal end, and a second side portion connected to the second distal end.

14. The blade adapting system according to claim 13 wherein the first side portion comprises a finger which extends from the blade clamp to allow a user to grasp the finger when removing the blade adapter from the blade clamp.

15. The blade adapting system according to claim 13 wherein:
    the means blade biasing comprises a ball biased by a spring; and
    the second saw blade shank has a hole formed therein, the second saw blade shank being positioned in the blade clamp by the blade adapter so that the ball is biased into the hole.

16. The blade adapting system according to claim 15 wherein the first side portion comprises a finger which extends from the blade clamp to allow a user to grasp the finger when removing the blade adapter from the blade clamp.

17. The blade adapting system according to claim 15 wherein the saw is a reciprocating saw and the second saw blade is sized to fit a jig saw.

18. The blade adapting system according to claim 17 wherein the blade adapter is made from steel in a stamping process.

* * * * *